US007666242B2

(12) United States Patent
Gednalske et al.

(10) Patent No.: US 7,666,242 B2
(45) Date of Patent: Feb. 23, 2010

(54) ADJUVANT BLEND FOR SPRAY ON FRUIT OR FOLIAGE

(75) Inventors: Joe V. Gednalske, River Falls, WI (US); Gregory Dahl, Eagan, MN (US); Richard Vanden Heuvel, Hudson, WI (US); Darin Ebeling, Rosemount, MN (US)

(73) Assignee: Winfield Solutions, LLC, Shoreview, MN (US)

( * ) Notice: Subject to any disclaimer, the term of this patent is extended or adjusted under 35 U.S.C. 154(b) by 616 days.

(21) Appl. No.: 10/977,543

(22) Filed: Oct. 29, 2004

(65) Prior Publication Data
US 2005/0247091 A1 Nov. 10, 2005

Related U.S. Application Data

(60) Provisional application No. 60/517,232, filed on Nov. 4, 2003.

(51) Int. Cl.
*C05D 9/00* (2006.01)
*C05D 9/02* (2006.01)

(52) U.S. Cl. .................. 71/31; 71/58; 71/59; 71/60; 71/61; 71/63; 71/64.1

(58) Field of Classification Search ............... 71/31–63, 71/64.1
See application file for complete search history.

(56) References Cited

U.S. PATENT DOCUMENTS

| | | | | |
|---|---|---|---|---|
| 2,756,134 A | 7/1956 | Novak | ............... | 71/1 |
| 3,353,949 A | 11/1967 | Nau | ............... | 71/64 |
| 3,640,698 A | 2/1972 | Backlund | .............. | 71/29 |
| 4,033,745 A | 7/1977 | Moore | ............. | 71/28 |
| 4,952,229 A | 8/1990 | Muri | ............... | 71/7 |
| 5,356,861 A | 10/1994 | Gednalski et al. | ........... | 504/206 |
| 5,549,729 A | 8/1996 | Yamashita | ..... | 71/26 |
| 5,797,976 A | 8/1998 | Yamashita | ..... | 71/26 |
| 5,945,377 A * | 8/1999 | Penner et al. | ............. | 504/362 |
| 5,958,104 A | 9/1999 | Nonomura et al. | ........... | 71/11 |
| 5,964,697 A | 10/1999 | Fowler, Jr. | ............. | 600/210 |
| 6,165,245 A | 12/2000 | Yamashita | ..... | 71/26 |
| 6,241,795 B1 * | 6/2001 | Svec et al. | ..... | 71/11 |
| 6,258,749 B1 * | 7/2001 | Nonomura | ................ | 504/121 |
| 6,309,440 B1 | 10/2001 | Yamashita | ..... | 71/27 |
| 6,318,023 B1 | 11/2001 | Yamashita | ..... | 47/58.1 |
| 6,460,290 B1 * | 10/2002 | Moore et al. | ................ | 47/48.5 |
| 6,589,913 B1 * | 7/2003 | Killick et al. | .............. | 504/206 |
| 2002/0077371 A1 | 6/2002 | Gouge et al. | ................. | 516/98 |
| 2002/0121046 A1 | 9/2002 | Yamashita | ................ | 47/58.1 |
| 2003/0167683 A1 | 9/2003 | Moore et al. | ................. | 47/485 |

FOREIGN PATENT DOCUMENTS

EP 0 837 044 B1 4/2003

OTHER PUBLICATIONS

"Lignins In Plant Micronutrients", Lignin Institute, Apr. 1994, vol. 3, No. 1, pp. 1-2.
Schalau, Backyard Gardener, "Plant Mineral Nutrition", Part 2, Dec. 9, 1998, pp. 1-3.

* cited by examiner

*Primary Examiner*—Wayne Langel
(74) *Attorney, Agent, or Firm*—Westman, Champlin & Kelly, P.A.; Z. Peter Sawicki

(57) ABSTRACT

An adjuvant that is applied to foliage or fruit or both of a plant and comprises an effective amount ammonium sulfate, an effective amount of an alkyl polysaccharide and n effective amount of a mono, di or polysaccharide. The adjuvant is dispersed in a selected amount of water along with a selected amount of micronutrients or secondary nutrients such that when applied to foliage or fruit or both of the plant, the adjuvant causes an increase in the intake of the micronutrients or secondary nutrients applied to foliage or fruit.

21 Claims, No Drawings

ADJUVANT BLEND FOR SPRAY ON FRUIT OR FOLIAGE

CROSS-REFERENCE TO RELATED APPLICATION(S)

This application claims the benefit of U.S. Provisional Application No. 60/517,232, filed Nov. 4, 2003.

BACKGROUND OF THE INVENTION

The present invention generally relates to a foliar or fruit applied adjuvant and fertilizer. More particularly, the present invention relates to an adjuvant that is applied to the foliage and/or fruit that increases the intake of nutrients by a plant into the fruit through the foliage and/or fruit.

Typically, fertilizers or nutrients are broadcast onto the ground and are either tilled into the soil or allowed to disperse through a ground layer and into the soil. Once in the soil, the nutrients are taken into plants, whether trees, cash crops, grass or other types of plants, through the root system.

There are instances when applying desired fertilizers or nutrients to the plant through the root system is impractical or impossible due to the location of the plants, the size of the plants or the condition of the soil. Whatever, the reason, there are times when the plant requires nutrients and the only means of delivering the nutrients to the plant is through a foliar spray.

However, some nutrients do not readily absorb into the plant through the foliage. Additionally, some nutrients must be dispersed over the foliage in relatively low concentrations and absorbed over a large area to prevent damage to the foliage, such as "burning" by concentrated nitrogen compounds.

SUMMARY OF THE INVENTION

The present invention includes an adjuvant that is applied to foliage and/or fruit of a plant. The adjuvant comprises an effective amount of ammonium sulfate, an effective amount of an alkyl polysaccharide and an effective amount of a mono, di or polysaccharide. The adjuvant is dispersed in a selected amount of water along with a selected amount of micronutrients or secondary nutrients such that when applied to the foliage or fruit, the adjuvant causes an increase in the intake of the nutrients into the fruit through the foliage or fruit.

DETAILED DESCRIPTION OF THE PREFERRED EMBODIMENTS

The present invention includes a liquid adjuvant blend for use as a foliar spray and fruiting structure spray that includes water, ammonium sulfate, an alkyl polysaccharide and a mono-di-or-polysaccharide such as fructose. The adjuvant blend is used to more evenly disperse the foliar spray over the foliage and/or fruit and increase the intake of a micronutrient or micronutrients and secondary nutrients by plants. The present invention includes both a ready to use premix comprising an effective amount of fructose, an effective amount of ammonium sulfate, an effective amount of an alkyl polysaccharide and an effective amount of the micronutrient or micronutrients, and secondary nutrients or a mixture that is tank formulated onsite in a spray tank which is sprayed upon the foliage and/or fruit to increase the intake of the micronutrient or micronutrients and secondary nutrients. The present invention surprisingly increases intake of micronutrients and secondary nutrients by plants to significantly higher levels.

The micronutrients and secondary nutrients of interest in the present invention include iron, zinc, manganese, magnesium, copper, calcium, boron, cobalt, iron (sulfur), sulfate, chlorine and molybdenum. By micronutrient is meant a nutrient whose natural level found in plants is 0.01% or less. By secondary nutrient is meant calcium, magnesium and sulfur. By macronutrient is meant nitrogen, phosphorus and potassium. The micronutrient or secondary nutrient comprises between about 0.0005 weight percent and about 1.0 weight percent on a weight basis of the total weight of the spray, except in the case of sulfur the amount of ammonium sulfate would be excluded. The source of the micronutrients for use in the adjuvant blend includes but is not limited to oxides, hydroxides, salts, carbonates, chlorides, nitrates, sulfates, sequestrates, chelates and complexes.

An unexhaustive list of oxides that may be useful in the present invention include FeO, $Fe_2O_3$, $Fe_3O_4$, ZnO, $ZnO_2$, CaO, $CaO_2$, MnO, $MnO_2$, $Mn_2O_3$, $Mn_2O_7$, $Mn_3O_4$, MgO, CuO, $Cu_2O$, $B_2O_3$, MoO, $MoO_2$, $MoO_3$, $Mo_2O_3$, $Mo_2O_5$, CoO, and $Co_3O_4$.

An unexhaustive list of sulfates that may be useful in the present invention include iron sulfate ($FeSO_4$), zinc sulfate ($ZnSO_4$), calcium sulfate ($CaSO_4$), manganese sulfate ($MnSO_4$), copper sulfate ($CuSO_4$), $MgSO_4$ molybdenum (molybdate salts), borates, polyborates, and cobalt sulfate ($CoSO_4$). Ammonium sulfate is preferred in a range from about 0 to about 34% by weight The present invention also includes chelated forms and complexes of the micronutrients. Some nonexhaustive examples of chelates for use with micronutrients and secondary nutrients include EDTA (Ethylenediaminetetracetic acid), HEDTA (N-(hydroxyethyl)-ethylenediaminetriacetic acid), DTPA (Diethylenetriaminepentaacetic acid), EDDHA (ethylene-diaminedi-o-hydroxyphenylacetic acid), Citric Acid, EDTA/Citric Acid Combinations, and NTA (Nitrilotracetic Acid).

Complexes of the micronutrients may also be formed and used as a source of the micronutrient. A nonexhaustive list of complexes include Mannitols and other complexing sugars, Glucoheptonates, Lignosulfonates, Humates, and Amino Acids.

A nonexhaustive list of mono-di-and polysaccharides that may be useful in the present invention include glucose, fructose, galactose, mannose, lactose, fucose, xylose, amylose, raffinose, maltotriose, glucosides, trehalose, and saccharide alcohols such as mannitol, sorbitol, xylitol and maltitol and compositions containing sugar such as molasses. The mono-di-and polysaccharides are preferred in a range from about 1.0 to about 20% by weight The alkyl polysaccharide of the present invention is a commercially available surfactant. The alkyl polysaccharides is preferred in a range from about 1 to about 20% by weight. Alkyl polysaccharides useful in the present invention include Agrimul PG 2069®, and APG 325®, available from Henkel Corporation of Ambler, Pa. Agrimul PG 2069® includes alkyl polyglycoside polymers with alkyl chains of nine carbons in a concentration of 20% by weight, ten carbon atoms in a concentration of 40% by weight and eleven carbon atoms in a concentration of 40% by weight The alkyl polyglycoside has an average degree of polymerization of 1.6, and is considered a non-ionic surfactant. It is non-gelling, biodegradable and soluble in dispersions of high salt concentrations.

Another alkyl polysaccharide of use is sold under the trade name AT Plus 438®, available from Uniqema Surfactant of Wilmington, Del. This alkyl polysaccharide is based on glucose and fatty alcohols derived from plant sources.

By utilizing the present invention, it has been found that at least about a 20% increase in intake of the micronutrients occurred over foliar spray without an adjuvant. Samples taken from plants have inherent variability levels of micronutrients. It is believed that an increase of about 20% represents a statistically significant increase.

Table 1 set forth below shows the results of treatment of soybeans with Fe with the adjuvant blend of the present invention (alkyl polysaccharide, fructose and ammonium sulfate). With no treatment, soybeans had a natural Fe content of 89 ppm (parts per million). Foliar spray of Fe without an adjuvant showed an increase in Fe content of approximately 168 ppm. Using adjuvants such as a non-ionic surfactant as described in U.S. Pat. No. 5,260,260, the Fe content in soybeans was increased to 191 ppm (12% increase over Fe without adjuvant). Utilizing a methylated seed oil adjuvant as described in U.S. Pat. No. 5,495,033, the Fe content in soybeans was 171 ppm (5% increase over Fe without adjuvant). Neither adjuvant increased Fe intake significantly when used as a foliar spray. However, utilizing the adjuvant blend of the present invention as a foliar spray, the Fe content increased to 257 ppm which is a 53% increase over Fe foliar application without an adjuvant.

TABLE 1

| Foliar Spray Treatment[1] | Fe Content in Soybeans (ppm)[4] |
|---|---|
| No treatment | 89 |
| Fe without adjuvant | 168 |
| Fe with non-ionic surfactant[2] | 191 |
| Fe with methylated seed oil[3] | 171 |
| Fe with alkyl polysaccharide, fructose and ammonium sulfate | 257 |

[1]Amount of Fe applied in each case was constant and the amount of adjuvant used when the adjuvant was used was also kept constant.
[2]U.S. Pat. No. 5,260,260
[3]U.S. Pat. No. 5,495,033
[4]Values are the mean from three combined replications. (Each replication is the mean of 10 samples.)

A study of the efficacy of individual components of the adjuvant blend of the present invention as individual adjuvants was also conducted. The components studied examined Fe content in soybeans. The amount of Fe applied was constant along with the amount of component used as an adjuvant. Utilizing "no treatment" as a control, the soybeans had a natural content of Fe of 90 ppm. Utilizing the adjuvant blend of the present invention, the Fe content in the soybeans increased to 169 ppm.

Utilizing only the ammonium sulfate as an adjuvant, the soybean content was 127 ppm, while utilizing the alkyl polysaccharide alone, the Fe content in soybeans was 126 ppm while fructose utilization as an adjuvant increased Fe content to 107 ppm in the soybeans.

TABLE 2

| Foliar Spray Treatment | Fe Content in Soybeans (ppm) |
|---|---|
| No treatment | 90 |
| Fe with alkyl polysaccharide fructose and ammonium sulfate | 169 |
| Fe with ammonium sulfate | 127 |
| Fe with alkyl polysaccharide | 126 |
| Fe with fructose | 107 |

As the results of Table 2 indicate, the three components, alkyl polysaccharide, ammonium sulfate and fructose, when combined for use as an adjuvant for foliar application increase micronutrient uptake much more than as individual components.

A further study was done to evaluate the increase of rate of application of adjuvant blend of the present invention while holding constant the amount of Fe being applied to the soybeans. The results of this study are shown in Table 3 set forth below. Increasing the rate of application of the adjuvant blend while holding the amount of Fe being applied constant shows an increase in intake of Fe by the soybeans with increasing application rate of the adjuvant blend.

TABLE 3

| Foliar Spray Treatment Description (Fe Application: 2 Quarts/Acre) | Appl'n Rate* | Fe Content in Soybeans (ppm) |
|---|---|---|
| Fe without adjuvant | — | 225 |
| Fe with adjuvant blend | 0.6 | 238 |
| Fe with adjuvant blend | 1.2 | 247 |
| Fe with adjuvant blend | 2.5 | 256 |
| Fe with adjuvant blend | 3.75 | 273 |

*Gallons/acre

The adjuvant blend of the present invention was used to increase manganese (Mn) intake in soybeans. The results of this trial are illustrated in Table 4 below. With no treatment, soybeans had a natural Mn content of 77 parts per million. Application of Mn without adjuvant resulted in a Mn content of 146 parts per million in the soybeans. Utilizing the non-ionic surfactant of U.S. Pat. No. 5,260,260, the Mn content in soybeans was 143 parts per million. Utilizing the adjuvant system of U.S. Pat. No. 5,495,033 the intake of manganese increased to 189 parts per million. Utilizing the adjuvant blend of the present invention, the Mn content in soybeans was 197 parts per million which was a 35% increase over the application of Mn without an adjuvant.

TABLE 4

| Foliar Spray Treatment[1] (Mn Application: 2 Quarts/Acre) | Mn Content in Soybeans ppm[4] |
|---|---|
| No treatment | 77 |
| Mn without adjuvant | 146 |
| Mn with non-ionic surfactant[2] | 143 |
| Mn with methylated seed oil[3] | 189 |
| Mn with alkyl polysaccharide, fructose and ammonium sulfate | 197 |

[1]Amount of Mn applied in each case was constant and the amount of adjuvant used when the adjuvant was used was also kept constant.
[2]U.S. Pat. No. 5,260,260
[3]U.S. Pat. No. 5,495,033
[4]Values are the mean from three combined replications. (Each replication is the mean of 10 samples.)

Another study was performed applying Fe with no adjuvant and then applying Fe with the adjuvant blend of the present invention, keeping the amount of Fe applied constant. The results of the study are listed in Table 5 below. As Table 5 indicates substantial increases in the intake of Fe by soybeans was realized when compared to foliar spraying of soybeans with Fe without adjuvant, with the amount of Fe being applied being kept constant.

TABLE 5

| Foliar Spray Treatment | Fe Content in Soybeans (ppm) | |
|---|---|---|
| 1 Qt/Acre Fe without adjuvant blend | 175 | |
| 1 Qt/Acre Fe with adjuvant blend | 215 | 23% increase |
| 2 Qts/Acre Fe without adjuvant blend | 220 | |
| 2 Qts/Acre Fe with adjuvant blend | 252 | 15% increase |
| 4 Qts/Acre Fe without adjuvant blend | 255 | |
| 4 Qts/Acre Fe with adjuvant blend | 334 | 31% increase |

Table 6 set forth below shows the results of studies of various crops subjected to foliar spray of micronutrients Zn, Mn, Fe and Cu without adjuvant, and the same micronutrients being applied with the adjuvant blend of the present invention. The adjuvant blend of the present invention aids in significant increase of micronutrient intake in corn, oats, soybeans, potatoes, alfalfa and rape seed of Zn, Mn, Fe and Cu. Situations in which a 20% or more increase of micronutrient intake occurred when compared to application without no adjuvant are indicated with a "+". Those situations in which micronutrient intake did not result in an increase of 20% or greater are indicated by a "−".

TABLE 6

| Crop | Zn (ppm) | Mn (ppm) | Fe (ppm) | Cu (ppm) |
|---|---|---|---|---|
| Corn | + | + | − | − |
| Oat | + | + | + | + |
| Soybeans | − | + | + | − |
| Potatoes | − | + | + | + |
| Alfalfa | + | − | + | + |
| Canola (Rape Seed) | + | + | + | + |

+ Intake 20% or greater when compared to nutrient application without adjuvant.
− Intake less than 20% when compared to nutrient application without adjuvant.

Bitter pit is a physiological disorder in apple fruit. Bitter pit is seen as dark sunken pits and brown corky tissue on the surface of apples. Research indicates that calcium deficiency is a key to bitter pit. Bitter pit can be controlled to some degree by ensuring an even crop load on the tree and applying calcium spray directly to the developing fruit. To evaluate the efficacy of the adjuvant blend of the present invention, the adjuvant blend was applied with calcium chloride directly to Honeycrisp apples in Minnesota.

Presently, the level of calcium that may be required to prevent Bitter Pit in the apple fruit tissue of Honeycrisp apples is not known. It is also not known whether the application of calcium alone will resolve bitter pit. However, as shown in Table 7 below, the use of the adjuvant blend of the present invention dramatically increases the intake of calcium by the apple fruit when applied directly to the fruit in a spray. For example, the natural calcium content with no application of calcium chloride in Honeycrisp apples is 0.055%. With a spray applying calcium chloride without adjuvant blend, the intake of calcium by the apple fruit was increased to 0.075%. However, using the adjuvant blend of the present invention, the calcium content increased to 0.175%.

TABLE 7

| Treatment | Ca Content in Apple Peels (% of Ca) |
|---|---|
| No treatment | .055 |
| $CaCl_2$ without adjuvant blend | .075 |
| $CaCl_2$ with fructose, ammonium sulfate and alkyl polysaccharide | .175 |

Although the present invention has been described with reference to preferred embodiments, workers skilled in the art will recognize that changes may be made in form and detail without departing from the spirit and scope of the invention.

The invention claimed is:

1. An adjuvant capable of application to foliage or fruit of a plant, the adjuvant comprising:
   an effective amount of ammonium sulfate;
   an amount of an alkyl polysaccharide in a range between greater than 1.0 to about 20 weight percent; and
   a mono, di or polysaccharide in a range between greater than 1.0 weight percent and about 20 weight percent and wherein the adjuvant is capable of dispensing in a selected amount of water along with a selected amount of micronutrients or secondary nutrients such that after dispersal and when applied to the foliage or fruit of the plant, the adjuvant causes an increase in the intake of the nutrients into the fruit through the foliage or fruit.

2. The adjuvant of claim 1 and wherein the mono, di or polysaccharide comprises fructose.

3. The adjuvant of claim 1 and wherein the effective amount of ammonium sulfate is in a range of between about 0 weight percent and 34 weight percent on a weight basis.

4. The adjuvant of claim 2 and wherein the effective amount of fructose is in a range of between about 1.0 weight percent and about 20 weight percent on a weight basis.

5. The adjuvant of claim 1 and wherein the adjuvant when dispersed in the water comprises between about 0.25 weight percent and about 5 weight percent of the combined mixture of water and the adjuvant.

6. A spray capable of providing micronutrients to a plant through the plant's foliage or fruit, the spray comprising:
   an effective amount of water;
   an effective amount of micronutrients or secondary nutrients; and
   an adjuvant comprising:
      an effective amount of ammonium sulfate;
      an amount of alkyl polysaccharide in a range between greater than 1.0 to about 20 weight percent; and
      a mono, di or polysaccharide in a range between greater than 1.0 weight percent and about 20 weight percent and wherein the adjuvant is capable of dispersing in a selected amount of water along with the effective amount of micronutrients or secondary nutrients such that after dispersal and when applied to the foliage or fruit of the plant, the spray causes an increase in the uptake of the nutrients into the fruit through the foliage or fruit.

7. The spray of claim 6 and wherein the micronutrients or secondary nutrients comprise iron, zinc, manganese, magnesium, copper, calcium, boron, cobalt, iron (sulfur), sulfate, chlorine and molybdenum.

8. The spray of claim 6 and wherein the micronutrients or secondary nutrients comprise oxides, hydroxides, salts, carbonates, chlorides, nitrates, sulfates, sequestrates, chelates and complexes.

9. The spray of claim 6 and wherein the mono, di or polysaccharide comprises fructose.

10. The spray of claim 6 and wherein the effective amount of ammonium sulfate is in a range of between about 0 weight percent and 34 weight percent of the adjuvant on a weight basis.

11. The spray of claim 9 and wherein the effective amount of fructose is in a range of between about 1.0 weight percent and about 20 weight percent of the adjuvant on a weight basis.

12. The spray of claim 6 and wherein the adjuvant is dispersed in the water such that the adjuvant comprises between about 0.25 weight percent and about 5 weight percent of the combined mixture of water and the adjuvant.

13. The spray of claim 7 wherein the micronutrient or secondary nutrient comprises between about 0.0005 weight percent and about 1.0 weight percent of the total weight of the spray except in the case of sulfur the amount of ammonium sulfate would be excluded.

14. A method of providing micronutrients or secondary nutrients to a plant comprising:
   admixing into water a selected amount of an adjuvant comprising:
      an effective amount of ammonium sulfate;
      an amount of alkyl polysaccharide in a range between greater than 1.0 to about 20 weight percent; and
      a mono, di or polysaccharide in a range between greater than 1.0 weight percent and about 20 weight percent;
   admixing into the water a selected amount of a micronutrient or secondary nutrient; and
   spraying the mixture of the water, the adjuvant and the micronutrient or secondary nutrient onto foliage or fruit of a plant and wherein adjuvant disperses the micronutrient or secondary nutrient on the foliage or fruit to increase the intake of the micronutrient or secondary nutrient into the fruit through the foliage or fruit.

15. The method of claim 14 and wherein the micronutrients or secondary nutrients comprise iron, zinc, manganese, magnesium, copper, calcium, boron, cobalt, iron (sulfur), sulfate, chlorine and molybdenum.

16. The method of claim 14 and wherein the micronutrients or secondary nutrients comprise oxides, hydroxides, salts, carbonates, chlorides, nitrates, sulfates, sequestrates, chelates and complexes.

17. The method of claim 14 and wherein the mono, di or polysaccharide comprises fructose.

18. The method of claim 14 and wherein the effect amount of ammonium sulfate is in a range of between about 0 weight percent and 34 weight percent of the adjuvant on a weight basis.

19. The method of claim 17 and wherein the effective amount of fructose is in a range of between about 1.0 weight percent and about 20 weight percent of the adjuvant on a weight basis.

20. The method of claim 14 and wherein the adjuvant when dispersed in the water comprises between about 0.25 weight percent and about 5 weight percent of the combined mixture of water and the adjuvant.

21. The method of claim 14 and wherein the micronutrient or secondary nutrient comprises between about 0.0005 weight percent and about 1.0 weight percent of the total weight of the spray except in the case of sulfur the amount of ammonium sulfate would be excluded.

* * * * *

UNITED STATES PATENT AND TRADEMARK OFFICE
CERTIFICATE OF CORRECTION

| | | |
|---|---|---|
| PATENT NO. | : 7,666,242 B2 | Page 1 of 1 |
| APPLICATION NO. | : 10/977543 | |
| DATED | : February 23, 2010 | |
| INVENTOR(S) | : Gednalske et al. | |

It is certified that error appears in the above-identified patent and that said Letters Patent is hereby corrected as shown below:

Title page, item (*) Notice:  Subject to any disclaimer, the term of this patent is extended or adjusted under 35
   U.S.C. 154(b) by 616 days.

Delete the phrase "by 616 days" and insert --by 975 days--.

Title page, item (57) Abstract

Line 3, delete "n" and insert --an--.

Signed and Sealed this

Thirty-first Day of August, 2010

David J. Kappos
*Director of the United States Patent and Trademark Office*